United States Patent
Wynn, Jr. et al.

(10) Patent No.: US 6,688,322 B2
(45) Date of Patent: Feb. 10, 2004

(54) APPARATUS AND METHOD FOR SEALING A FUEL COMPONENT IN A FUEL COMMUNICATION PASSAGE

(75) Inventors: James A. Wynn, Jr., Virginia Beach, VA (US); Barry S. Robinson, Williamsburg, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/382,645

(22) Filed: Mar. 7, 2003

(65) Prior Publication Data

US 2003/0155013 A1 Aug. 21, 2003

Related U.S. Application Data

(62) Division of application No. 09/922,696, filed on Aug. 7, 2001, now Pat. No. 6,619,314.

(51) Int. Cl.$^7$ ............................................. F16K 27/12
(52) U.S. Cl. ........................ 137/15.19; 137/315.05; 137/510
(58) Field of Search ........................ 137/15.19, 510, 137/315.05; 123/456, 459, 463, 465

(56) References Cited

U.S. PATENT DOCUMENTS

| | | | |
|---|---|---|---|
| 4,474,160 A | 10/1984 | Gartner | 123/468 |
| 4,756,289 A | * 7/1988 | Rock et al. | 123/463 |
| 4,805,575 A | 2/1989 | de Concini et al. | 123/468 |
| 4,928,729 A | 5/1990 | Hornby | 137/510 |
| 5,016,594 A | 5/1991 | Hafner et al. | 123/470 |
| 5,163,468 A | 11/1992 | Robinson et al. | 137/315 |
| 5,469,829 A | * 11/1995 | Kleppner et al. | 123/514 |
| 5,479,900 A | 1/1996 | Bodenhausen et al. | 123/470 |
| 5,720,263 A | 2/1998 | Frank et al. | 123/514 |
| 5,727,529 A | 3/1998 | Tuckey | 123/514 |
| 5,845,621 A | 12/1998 | Robinson et al. | 123/456 |
| 6,230,685 B1 | 5/2001 | Kilgore et al. | 123/467 |
| 6,343,589 B1 | * 2/2002 | Talaski et al. | 123/514 |

* cited by examiner

*Primary Examiner*—Stephen M. Hepperle

(57) ABSTRACT

A fuel component assembly having a fuel component disposed between a base and a cover, which prevent fluid communication to an exterior thereof. The fuel component defines at least one aperture, the base supports the fuel component and defines a passage in communication with the at least one aperture. The cover is located proximate the base. A securement having a projection and the receiver that engage to form a fluid tight seal. The projection is radially disposed about a longitudinal axis of the fuel component, and the receiver continuously engages the projection. The projection being disposed on one of the cover and the base, and the receiver being disposed on the other of the cover and the base. The fuel component assembly allows for a method of encapsulating a fuel component within a fuel supply. The method can be achieve by defining a passage within a base of an assembly; seating the fuel component within the passage; providing a cover that is contiguous with the base; and welding the cover to the base to form a hermetic seal. The fuel component assembly also provides a method of regulating a fuel supply. The method can be achieved by encapsulating a fuel component within a passage defined by a continuous wall of a housing; and controlling the pressure of fuel within the passage with the fuel component.

22 Claims, 2 Drawing Sheets

APPARATUS AND METHOD FOR SEALING A FUEL COMPONENT IN A FUEL COMMUNICATION PASSAGE

This divisional application claims the benefits of 35 U.S.C. §120 based on U.S. application Ser. No. 09/922.696, now U.S. Pat. No. 6,619,314 filed Aug. 7, 2001, entitled "Apparatus and Method for Sealing Fuel Component in a Fuel Communication Passage," which is hereby incorporated by reference in its entirety in this divisional application.

BACKGROUND OF THE INVENTION

The disclosed invention relates generally to regulation of fuel within a fuel passage. There is a need for new and innovative approach for installing a fuel component such as a fuel regulator within a fuel passage such as a fuel supply line. This invention responds to that need by sealing a fuel component within a fuel communication passage without an elastomeric member.

SUMMARY OF THE INVENTION

The present invention provides a fuel component assembly having a fuel component disposed within a housing. The fuel component defines at least one aperture that receives fuel. The housing preferably, has a base and a cover. The base supports the fuel component and defines a passage in communication with the at least one aperture of the fuel component. The cover is located proximate the base, and a securement is employed to fix the cover to the base. The securement has a projection radically disposed about a longitudinal axis, and a receiver that continuously engages the projection. The projection is disposed on one of the cover and the base, and the receiver being disposed on the other of the cover and the base.

The present invention also provides a method of encapsulating a fuel component within a fuel supply. The method is preferably achieved by defining a passage within a base of an assembly; seating the fuel component within the passage; providing a cover that is contiguous with the base; and welding the cover to the base to form a hermetic seal.

The present invention further provides a method of regulating a fuel supply. The method is preferably achieved by encapsulating a fuel component within a passage defined by a continuous wall of a housing; and controlling the pressure of fuel within the passage with the fuel component.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
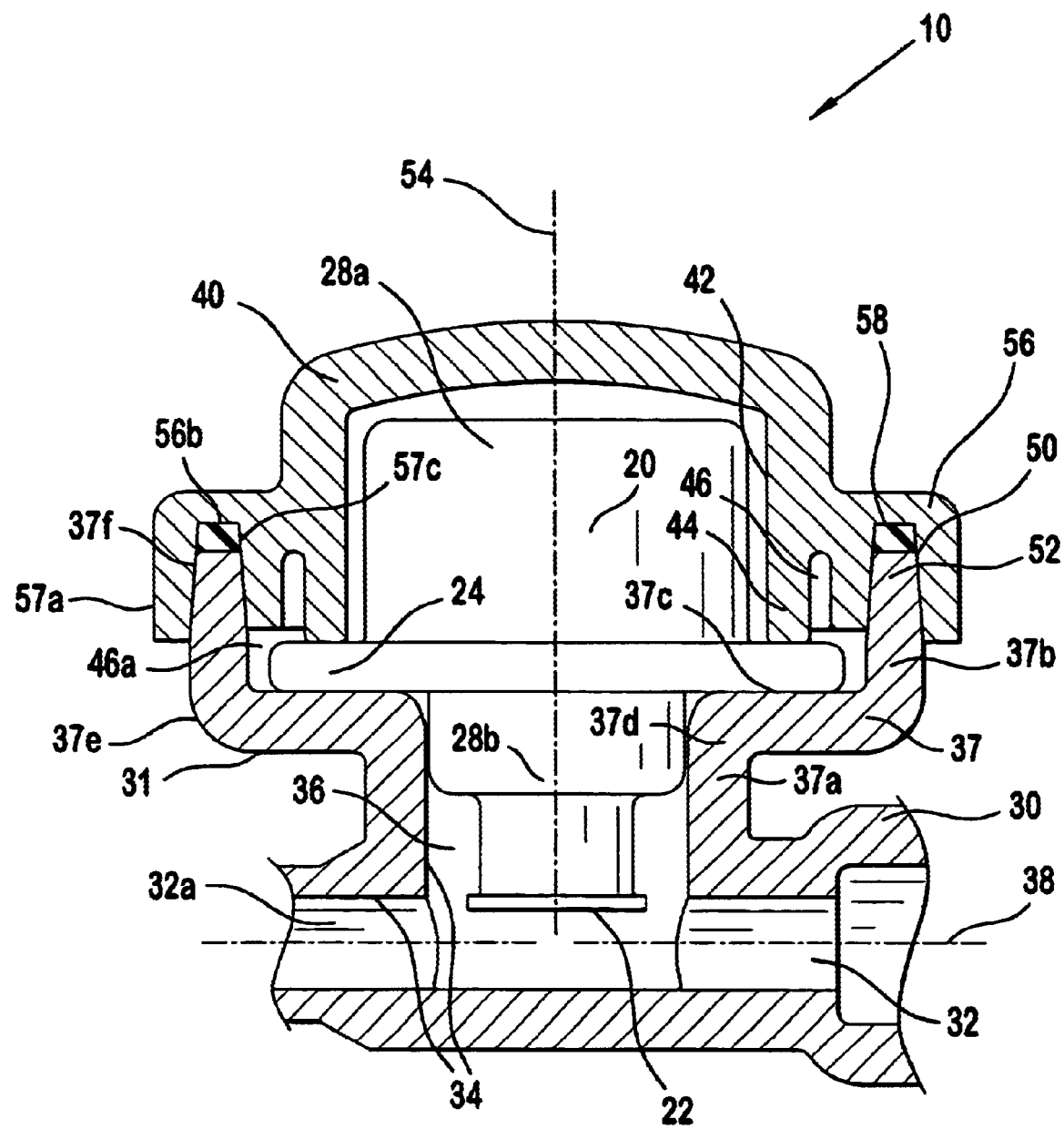
FIG. 1 illustrates a cross section of a first preferred embodiment, in which the fuel component is a fuel damper.

FIG. 1 illustrates a fuel component assembly 10. The assembly 10 includes a fuel component 20, a base 30, a cover 40 and a securement 50. The fuel component 20 defines at least one aperture 22. The fuel component 20 is supported by a base 30. The base 30 defines a passage 32 which is in communication with the aperture(s) 22. The assembly 10 further comprises a cover 40 which is proximate to a base 30. The cover 40 and the base 30 are secured to one another to create a contiguous seal that prevents communications to the fuel component 20. The seal is achieved by providing a securement 50. The securement 50, preferably, includes a projection 52 which is radially disposed about a longitudinal axis 54. The securement 50, further comprises a receiver 56 that contiguously engages the projection 52. The seal may be a hermetic seal. The seal may include a weldment 58.

Figure 2:
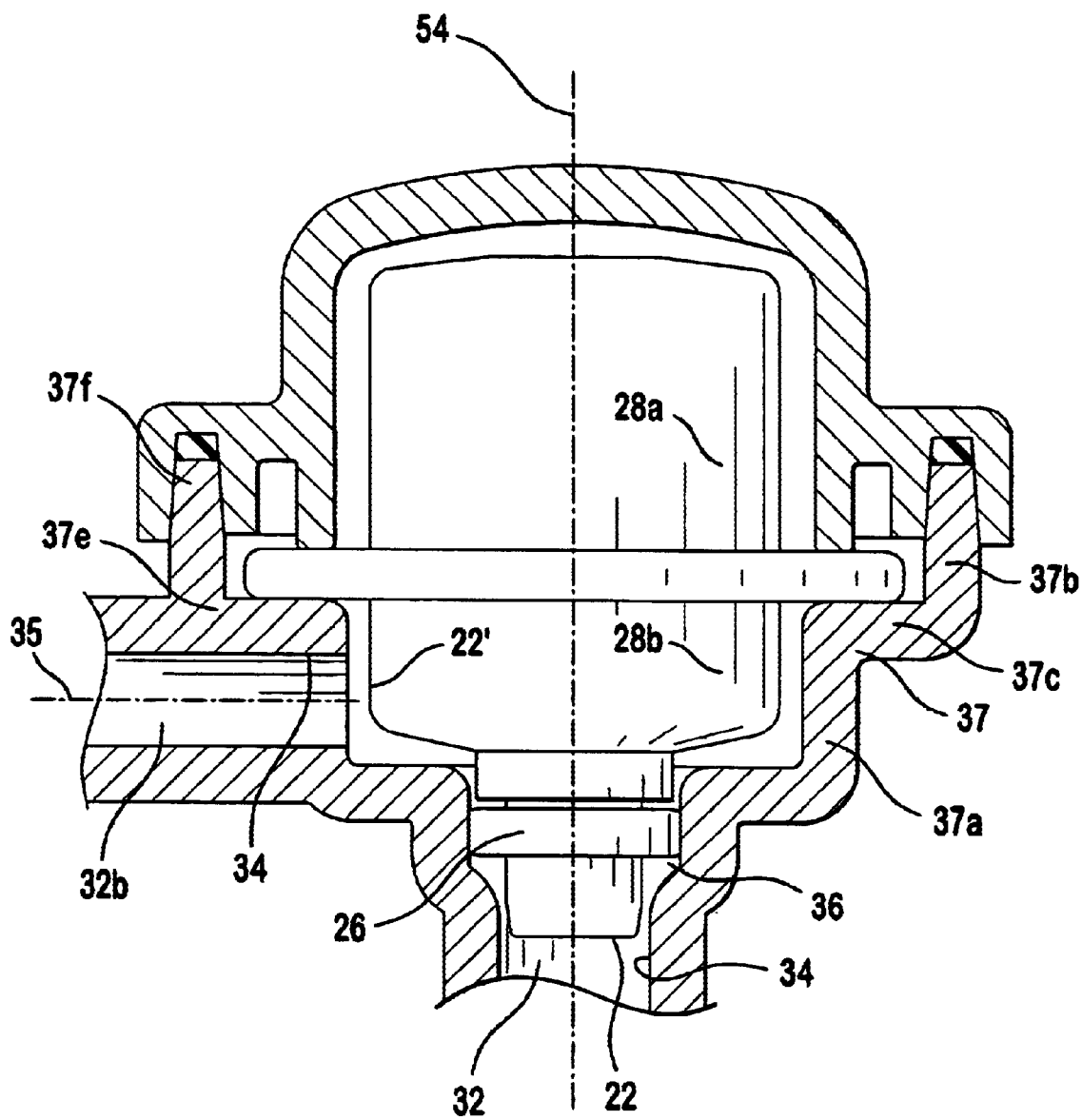
FIG. 2 illustrates a second preferred embodiment, in which the fuel component is a fuel regulator.

The fuel component 20, illustrated in preferred embodiments of FIGS. 1 and 2, comprises a flange 24, an upper housing 28a and a lower housing 28 which is proximate the flange. The flange 24 supports the fuel component 20 with the base 30 and cover 40.

The fuel component 20 may be a fuel pressure regulator, a damping device or some other device as those skilled in the art will appreciate which regulates the pressure in a fuel supply. An example of a fuel component, the operation of which would benefit from this assembly is a pressure regulator, illustrated in U.S. Pat. Nos. 4,928,729 and 5,163,468, however the regulator disclosed in each of these patents would be configured to have an upper housing without a nipple. One example of a fuel damper, the operation of which will benefit from this assembly, illustrated in U.S. Pat. No. 6,230,685 which are hereby incorporated in their entirety by reference.

In the embodiment illustrated in FIG. 2, fuel component 20 further comprises a ring 26, which is located at an end of the lower housing 28 opposite the end and is proximate the flange 24.

In the embodiments of FIGS. 1 and 2, the base 30 is disposed about a longitudinal axis 54. The base 30 has a radial wall 37 which is disposed about the longitudinal axis 54. The radial wall 37 has a lower wall 37a and an upper wall 37b. The lower wall has a platform 37c and a rise 37d. The rise. 37d, in the embodiment of FIG. 1, is parallel to the longitudinal axis 54. In alternative embodiments, however, non-parallel configurations may be employed so long as these configuration provides the required support function that the rise provides to the base.

The lower wall 37a in the embodiment illustrated in FIG. 2 defines a platform 37c and comprises an inner surface 34 which defines a chamber 36. The inner surface 34 in this embodiment is configured to be disposed about a lower chamber 28 such that aperture 22' is in communication with chamber 36 and passage 32b. The inner surface 34 in this embodiment, is further configured such that it constrains the fuel component 20 from moving relative to the longitudinal axis 54 by supporting the fuel component 20 at ring 24. Alternatively, as shown in FIG. 1, inner surface 34 can be configured to constrain fuel component 20 relative to the longitudinal axis 54, by supporting the fuel component 20 at the lower chamber 28.

The platform 37c is adapted to support the fuel component 20. In the embodiments shown, the platform supports the fuel component 20 at the fuel component flange 24 such that the fuel component 20 is restrained from moving relative to an axis which is perpendicular to longitudinal axis 54. The flange 24 may extend across the full distance across platform 37c, however, in the preferred embodiment such a configuration of flange 24 is not required. Alternatively, the flange 24 and the base 37 can be dimensioned such that the base supports the flange to restrict movement relative the longitudinal axis 54.

In FIGS. 1 and 2, a passage 32 is defined by the base 30 and is further defined by an inner surface 34. As is illustrated in FIGS. 1 and 2, the inner surface 34 is, preferably, configured to constrain the fuel component 20 from movement with respect to the longitudinal axis 54. Other embodiments may utilize other surfaces for features of components to restrain fuel component 20 instead of or in addition to surface 34. One example of such a configuration is where a fuel component flange is configured to restrain the fuel component from motion relative to both longitudinal and transverse axes.

In the embodiment shown in FIG. 1, inner surface 34 additionally defines a chamber 36 wherein the fuel component 20 is constrained from movement with respect to the longitudinal axis 54. In this embodiment, chamber 36 and passage 32a are disposed in communication with one another. Passage 32a is disposed about an axis 38 which is transverse to the longitudinal axis 54. Alternatively, passage 32 may be disposed about an axis which is parallel to the longitudinal axis 54. For example, FIG. 2 illustrates, an embodiment with a parallel axis co-axial with axis 54.

The base 30 may also define a second passage 32b which is in communication with the first passage 32. This second passage 32b may be disposed about an axis which is convergent with the longitudinal axis 54. Alternatively, FIG. 2, illustrates an embodiment where the second passage 32b is disposed about an axis 35 which is perpendicular to axis 54.

FIG. 1 illustrates, the fuel component 20, the chamber 36, and the passage 32 each dimensioned such that the aperture 22 is positioned between the transverse axis 38 and the portion of the inner surface of passage 32a that meets with rise 37d. This configuration advantageously exposes the aperture 22 to the flow of fuel in passage 32 while maintaining communication with the chamber 36. Those skilled in the art will appreciate that placement of the aperture 22 may vary depending on the desired results and the type of fuel component selected. In embodiments where the fuel component is a flow-through-type fuel component, and there is an inlet and outlet aperture utilized, each aperture will be aligned with a respective passage. For example, in FIG. 2, fuel component 20 includes a second aperture 22', which is, preferably, aperture aligned with passage 32b.

In FIGS. 1 and 2, the upper wall 37b has a proximal end 37e and a distal end 37f. The proximal end 37e is in continuity with the platform 37c and the distal end 37f extends therefrom. The upper wall 37b may be, as is illustrated in the FIG. 1 and 2, parallel to the longitudinal axis 54 though other configurations may also be used to form the cavity. As illustrated in FIG. 1 and 2, the inner surface of radial wall 37 defines a cavity; the upper wall 37b defining an upper cavity. In the configuration shown, the upper wall 37b also serves as an element of securement 50.

Securement 50 as illustrated in FIGS. 1 and 2 is a continuous joint that prevents fluid communication from the assembly. Preferably, the joint is a mechanical coupling of the cover to the base. The mechanical coupling may include a gasket, however, the gasket should not be the primary device to form the fluid tight connection. The connection can be a direct connection between the cover and the base. Alternatively, the connection between the cover and the base could include intermediate components to provide an indirect connection. The intermediate components of the indirect connection between the cover and the base should include non-elastomeric members. Preferably, the non-elastomeric members would be rigid members fixed to the cover, the base, or both.

The securement may also provide structural support among the components of the assembly. As illustrated in the preferred embodiments, securement 50 comprises a projection 52 and a receiver 56. The projection 52 and the receiver 56 can be provided on either of the base or cover. Additional more than one type projections [and or receiver 56 could be used to form the securement 50, and portions of each projection 52 and receiver 56 can be located on the cover, the base, or both so long as the securement forms a fluid tight mechanical seal. Preferably, the projection 52 in FIG. 1 and 2 is formed by the upper wall 37b, and is dimensioned such that it can be fit into a receiver 57. There may be configurations, such as in FIG. 1 and 2, where it is advantageous to taper the projection 56. In the embodiment of FIGS. 1 and 2, the receiver 56 has three inner surfaces 56a, b, and c. Each of these inner surfaces engages the projection 52. The securement may alternatively be achieved by with fewer or greater than three surfaces of engagement. The securement may also be achieved by laser welding a wall of the base to the cover. The securement may further be achieved by providing a bump on either the base or the cover which engages a groove on the other of the cover or the base.

The securement 50 illustrated in FIGS. 1 and 2 also incorporates a weldment 58. The weldment 58 may be located at the tip of the projection 52 as illustrated in FIGS. 1 and 2. The placement of the weldment may vary depending on the configuration of the securement. Where the assembly is plastic, this weldment 58 may be of the spin, ultrasonic, or solvent type. Though FIGS. 1 and 2 demonstrate a securement configured with the projection 52 on the base 30, and the receiver 56 on the cover 40, the opposite embodiment might be equally advantageous; with the projection 52 disposed on the cover 40 and the receiver 56 disposed on the base 30.

In FIGS. 1 and 2 the cover 40 includes an inner wall 42 that defines a cavity. Alternatively, the cover 40 may have planar configuration such that the cover does not define a cavity. Where the cover does define a cavity, such as in FIGS. 1 and 2, the inner wall 42 defining that cavity may be dimensioned to contain a portion of the fuel component 20. The cover 40 shown in FIGS. 1 and 2 is further configured to support the fuel component 20 such that the fuel component 20 is constrained from motion relative to an axis that is perpendicular the longitudinal axis 54. If the fuel component 20 is configured with a flange 24, the cover 40 may engage the flange 24 to achieve that restraint. Where the cover 40 engages the flange 24, the flange 24 may further engage the base. Such engagement with the base 40 may be with the platform 37c. The cover 40, preferably, has a tab 44 which engages the fuel component 20. As illustrated in FIGS. 1 and 2, that tab 44 may be radially disposed about the longitudinal axis 54. The tab 44 may furthermore, support the fuel component 20, by engaging the fuel component 20 at a flange 24 disposed on the fuel component 20 such that the flange is constrained between the platform 37c and the tab 44. In other embodiments, the cap may support the fuel component by forcing contact between another portion of the fuel component and another portion of the base to effect the same constraint. For example, where the base is provided without a rim, or the fuel component is provided without a flange, the cap may contact another surface of the fuel component thereby applying pressure to seat the fuel component in the base.

The cover 40 may further define an annulus 46 between the tab and the securement. The annulus 46 may be radially disposed about the longitudinal axis 54 as illustrated in FIGS. 1 and 2. When the flange 24 is dimensioned to extend partially along the platform 37c, as is illustrated in FIGS. 1 and 2, and the tab is engaging the platform, there will be defined a second annulus 46a which will be in communication with annulus 46.

The preferred embodiments described above allow for a method for encapsulating a fuel component 20 within a fuel supply. The method includes defining a passage 32 within a base 30 of an assembly, and seating the fuel component 20 within the passage. The method is further accomplished by providing a cover 40 that is contiguous with the base 30. The method also accomplished by welding the cover to the base to form a hermetic seal.

FIGS. 1 and 2 illustrate preferred embodiments that allow for the method. In these embodiments, the fuel component defines at least one aperture. The fuel component 20 is positioned between the cover 40 and the base 30 such that the aperture(s) are aligned with the passage 32 and such that the cover 40 and the base 30 support the fuel component 20 thus restraining the fuel component 20 from movement relative to the cover and the base. The cover is then welded to the base thereby forming a contiguous member which seals the assembly against leakage of fluid from the assembly, i.e. forms a fluid tight seal.

The preferred embodiment also allows for a novel method of regulating a fuel supply. The method can be accomplished by encapsulating a fuel component 20 within a passage 32 defined by a continuous wall of a housing, and controlling the pressure of fuel within the passage with the fuel component. This method can be accomplished with the embodiments also illustrated in FIGS. 1 and 2. In these preferred embodiments, the fuel component 20 is a fuel damper or pressure regulator. The contiguous wall 37 is formed by joining the cover 40 with the base 30. There is defined within this joined cover 40 and base 30 members a passage 32 which is capable of conveying fuel through the joined cover 40 and base 30. The fuel component 20 is encapsulated within this passage 32 such that the fuel within the passage interacts with the fuel component 20. The pressure fuel component 20 thereby controls the fuel pressure within the passage 32. There may be embodiments of this method where the fuel within the passage is controlled by channeling the fuel through the fuel component 20. In that case, fuel is channeled into at least one aperture 22 of the fuel component 20. The fuel that enters the aperture 22 acts against a diaphragm so that the diaphragm flexes to control the fuel within the passage 32. In FIG. 2, the fuel is channel into at least one aperture 22' or 22. The fuel passes through the fuel component 20 and exits the other of the at least one apertures 22' or 22. In FIG. 1, the fuel is channelled into and exists the at least one aperture 22.

The encapsulation of the fuel component within the passage may be achieved by providing a securement 50. As illustrated in FIGS. 1 and 2, that securement may comprise a base that is contiguous with a cover. In the embodiments shown, the securement is achieved by joining a projection 52 of the base 30 and a receiver 56 of the cover 40. Alternatively the securement could be rearranged so that a projection is provided on the cover and the receiver is provided on the base.

As illustrated in FIGS. 1 and 2, the forming of the base 30 could define the passage 32 of the method. In that embodiment, the cover 40 may be formed to interlock with the base to form a cavity between which would communicate with the passage 32. The fuel component is seated within the cavity 32 and the cover 40 is sealed to the base 30. In the embodiments shown, the fuel component 20 is seated between the cover 40 and the base 30 such that the fuel component 20 is restrained from movement relative to the base 30 and the cover 40. In this embodiment, the cover is sealed to the base with a weldment 58.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of encapsulating a fuel component within a fuel supply comprising:
    defining a passage within a base of an assembly, the base having a first surface extending along a longitudinal axis;
    seating the fuel component within the passage;
    providing a cover having a second surface contiguous with the first surface of the base; and
    welding the second surface of the cover to the first surface of the base to form a hermetic seal without an intermediate sealing member interposed therebetween.

2. The method of claim 1, wherein the providing a cover comprises defining a cavity with an inner wall of the cover.

3. The method of claim 1, wherein the seating further comprises supporting the fuel component with the cover and the base.

4. The method of claim 3, wherein the supporting further comprises:
    engaging a rim of the fuel component with a lip of the base;
    engaging a tab of the cover with the rim; and
    engaging a housing of the fuel component with an inner surface of the base.

5. The method of claim 1, wherein the seating further comprises:
    defining at least one aperture of the fuel component;
    exposing the at least one aperture of the fuel component to the passage.

6. The method of claim 1, wherein the seating further comprises:
    defining a plurality of apertures of the fuel component;
    defining a chamber of the base that is in communication with the passage;
    exposing at least one aperture of the fuel component to the passage;
    exposing at least one other aperture of the fuel component to the chamber.

7. The method of claim 1, wherein the welding comprises engaging a projection extending along the longitudinal axis of either the cover or the base to a receiver of the other of the cover or the base.

8. A method of regulating a fuel supply comprising:
    encapsulating a fuel component within a passage defined by a continuous wall of a housing, the encapsulating including providing a securement formed between a base having a first surface extending along a longitudinal axis contiguous with a second surface of a cover so that the first and second surfaces form a hermetic seal without an intermediate sealing member interposed therebetween; and controlling the pressure of fuel within the passage with the fuel component.

9. The method of claim 8, wherein the encapsulating further comprises:

forming a base to define a passage;

forming a cover that is adapted to interlock with the base there being a cavity formed between the cover and the base the cavity being in communication with the passage;

seating a fuel component within the cavity; and sealing the cover to the base.

10. The method of claim 9, wherein the seating comprises defining at least one aperture of the fuel component;

exposing the at least one aperture of the fuel component to the passage.

11. The method of claim 9, wherein the seating further comprises:

defining a plurality of apertures of the fuel component;

exposing at least one aperture of the fuel component to the passage;

exposing at least one other aperture of the fuel component to the chamber.

12. The method of claim 9, wherein the seating further comprises supporting the fuel component with the cover and the base.

13. The method of claim 12, wherein the supporting further comprises:

engaging a rim of the fuel component with a lip of the base;

engaging a tab of the cover with the rim; and engaging a housing of the fuel component with a surface of the passage.

14. The method of claim 9, wherein the sealing further comprises positioning a rubber seal between the cover and the base.

15. The method of claim 9, wherein the sealing further comprises welding the cover to the base.

16. The method of claim 9, wherein the controlling comprises channeling fuel in the passage through the fuel component.

17. The method of claim 1, wherein the welding comprises forming a plastic weldment between the cover and the base by one of spin, ultrasonic or solvent type plastic weldment.

18. The method of claim 17, wherein the seating comprises locating a fuel component selected from a group consisting of a fuel damper and fuel pressure regulator.

19. The method of claim 9, wherein the sealing comprises forming a plastic weldment between the cover and the base by one of spin, ultrasonic or solvent type plastic weldment.

20. The method of claim 19, wherein the encapsulating comprises locating a fuel damper to a fixed position within the fuel component assembly, the fuel damper having an aperture in fluid communication with the passage disposed in the body.

21. The method of claim 20, wherein the locating comprises clamping the fuel damper to the fixed position with a tab of the cover and a platform of the base.

22. The method of claim 21, wherein the forming comprises providing a plastic body and cover.

* * * * *